(12) United States Patent
Wei et al.

(10) Patent No.: US 7,627,636 B2
(45) Date of Patent: Dec. 1, 2009

(54) SECURELY EXTENDING DATA PROCESSING PIPELINE FUNCTIONALITY

(75) Inventors: Min Wei, Bellevue, WA (US); Vivek Sharma, Redmond, WA (US); Qiang Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 10/974,135

(22) Filed: Oct. 27, 2004

(65) Prior Publication Data

US 2006/0075045 A1    Apr. 6, 2006

Related U.S. Application Data

(63) Continuation of application No. 10/928,578, filed on Aug. 27, 2004.

(51) Int. Cl.
    G06F 15/16    (2006.01)
(52) U.S. Cl. .................. 709/206; 709/202; 709/223; 719/317; 719/328
(58) Field of Classification Search ............. 709/201, 709/202, 206, 207, 223, 224; 719/313–318, 719/328
    See application file for complete search history.

(56) References Cited

U.S. PATENT DOCUMENTS

| | | | |
|---|---|---|---|
| 5,377,354 A | 12/1994 | Scannell | |
| 5,796,394 A | 8/1998 | Wicks et al. | 345/329 |
| 5,826,269 A | 10/1998 | Hussey | 707/10 |
| 5,917,489 A | 6/1999 | Thurlow et al. | 345/347 |
| 6,073,142 A | 6/2000 | Geiger et al. | 707/500 |
| 6,119,118 A * | 9/2000 | Kain et al. | 707/10 |
| 6,141,794 A | 10/2000 | Dice | |
| 6,199,102 B1 | 3/2001 | Cobb | 709/206 |
| 6,212,535 B1 | 4/2001 | Weikart et al. | 707/513 |
| 6,360,262 B1 | 3/2002 | Guenthner | |
| 6,438,545 B1 | 8/2002 | Beauregard et al. | 707/6 |
| 6,654,787 B1 | 11/2003 | Aronson | |
| 7,127,520 B2 * | 10/2006 | Ladd et al. | 709/231 |
| 7,185,060 B2 | 2/2007 | Christensen | |
| 2002/0099681 A1 | 7/2002 | Gainey et al. | 707/1 |
| 2003/0131063 A1 | 7/2003 | Breck | |
| 2004/0030707 A1 | 2/2004 | Lu | |
| 2004/0128498 A1 | 7/2004 | Lang | |
| 2004/0235503 A1 | 11/2004 | Koponen | |

(Continued)

OTHER PUBLICATIONS

U.S. Appl. No. 10/928,578, filed Aug. 27, 2004, Wei, et al.

(Continued)

Primary Examiner—David Lazaro
(74) Attorney, Agent, or Firm—Workman Nydegger

(57) ABSTRACT

The present invention extends to methods, systems, and computer program products for securely and efficiently extending data processing pipeline functionality. Data processing agents register, potentially based solely on configuration data contained in the data processing agents, to manipulate data of a data processing pipeline. Configuration data can identify a specified event (e.g., an SMTP verb) the data processing agent is to hook into. Upon detection of a specified event, one or more agents that have registered for the specified event are loaded into secure zones. Process boundaries separate agents from one another and from other processes such that execution of each agent is isolated from other processes. Pipeline related data (e.g., electronic message data) is transferred to each loaded agent. Application Program Interfaces ("APIs") can be used to transfer data between modules that implement embodiments of the present invention.

30 Claims, 6 Drawing Sheets

U.S. PATENT DOCUMENTS

2005/0204003 A1    9/2005    Vargas

OTHER PUBLICATIONS

Crocker, David H., *RFC822: Standard for ARPA Internet Text Messages*, University of Delaware, Newark, DE, 1982.

Pollack, Steven, *A Rule-Based Message Filtering System*, p. 232-254, 1988.

Postel, Jonathan B., *Simple Mail Transfer Protocol*, University of California, Information Sciences Institute, Aug. 1982.

Klensin, J., RFC 2821 "Simple Mail Transfer Protocol", <http://www.ietf.org/rfc/rfc2821.txt>, Apr. 2001, pp. 13-19.

Office Action dated Mar. 18, 2009 cited in U.S. Appl. No. 10/928,578.

* cited by examiner

501 — Initialize ( Server Identifier, Configuration file Identifier, Agent Group Identifier )

502 — Invoke ( Execution Context, Event Topic, Context List )

503 — Begin Invoke ( Execution Context, Event Topic, Time Out Value, Callback, State, Context List )

504 — Handler ( Event Source Identifier, Event Data )

Fig. 5

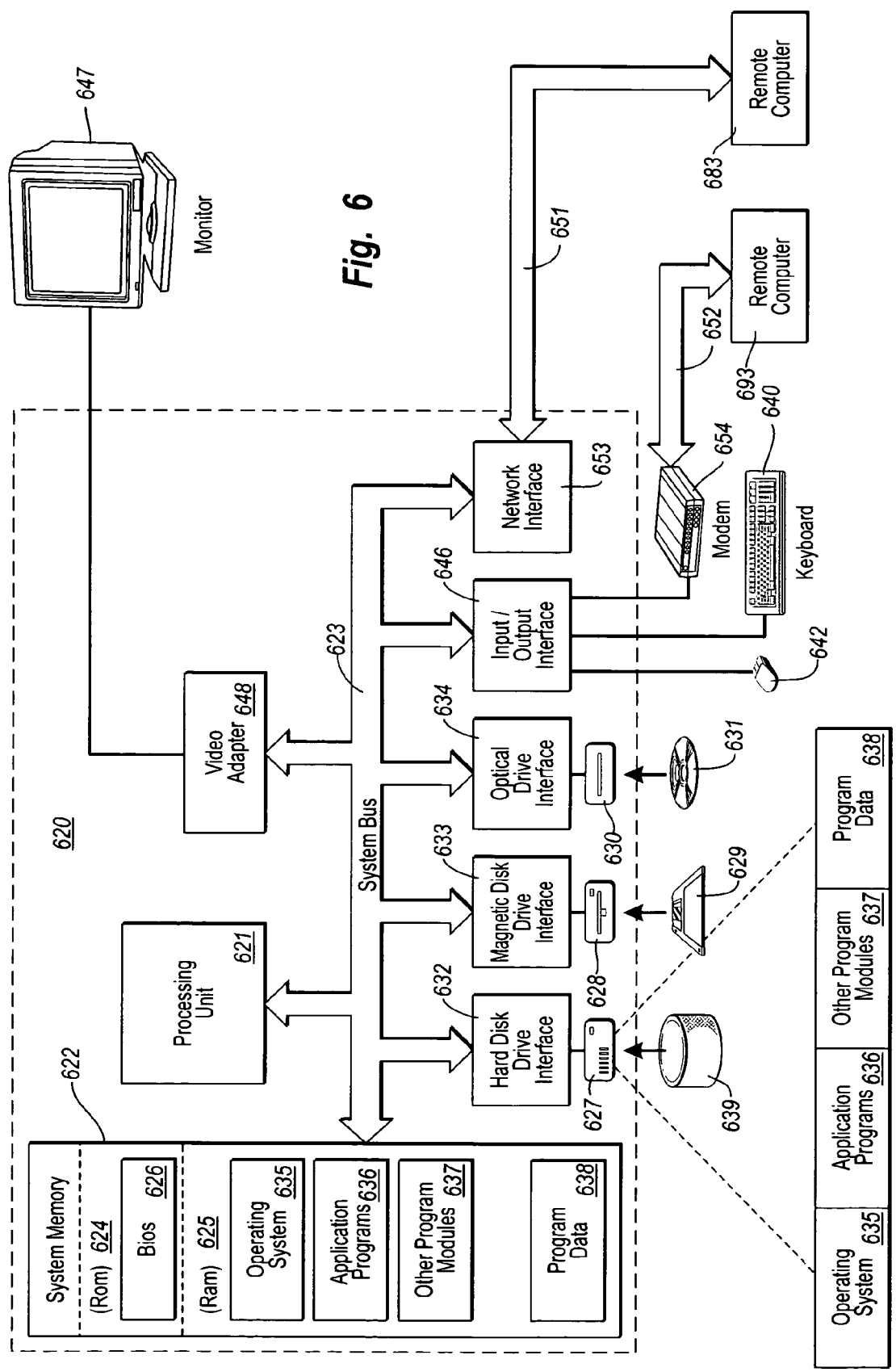

SECURELY EXTENDING DATA PROCESSING PIPELINE FUNCTIONALITY

CROSS-REFERENCE TO RELATED APPLICATIONS

This application is a continuation of U.S. patent application Ser. No. 10/928,578, filed Aug. 27, 2004, and entitled "Securely And Efficiently Extending Data Processing Pipeline Functionality", which is herein incorporated by reference in its entirety.

BACKGROUND OF THE INVENTION

1. The Field of the Invention

The present invention relates to data processing and, more particularly, to securely and efficiently extending data pipeline processing functionality.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computing system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

In particular, electronic mail has become an important method for communicating. To create an electronic mail message, a sending user typically manipulates input devices, such as a keyboard and mouse, within an electronic mail application to enter data (e.g. text and attachments) into the electronic mail message. The sending user also typically includes an electronic mail address of a recipient user in the electronic message, for example, by entering text in the "To" field. The sending user then sends the electronic mail message to the recipient user by selecting a "Send" control within the electronic mail application. Sending the electronic message can cause the electronic mail message to be routed from the sending user's computer system, through one or more intermediate mail servers, to a destination mail server that stores electronic mail messages for the recipient user (e.g., in accordance with the Simple Mail Transfer Protocol ("SMTP"). To view the electronic mail message, the recipient user establishes a connection from an electronic mail application (at the recipient user's computer system) to the receiving mail server (e.g., in accordance with the Post Office Protocol ("POP") or Internet Message Access Protocol ("IMAP")).

At each mail server, the electronic message is transferred through a message processing pipeline. The message processing pipeline can include one or more modules that perform different actions to the electronic mail message and/or in response to receiving the electronic message. For example, a message processing pipeline can establish an SMTP connection (in accordance with SMTP commands) to receive the electronic mail message, can perform one or more operations based on the contents of the electronic message (e.g., determine how to route the message based on the destination Internet Protocol ("IP") address), and establish an SMTP connection in accordance with SMTP commands) to route the message towards a destination mails server. At a destination mail server, a message processing pipeline can also implement additional functionality, such as, for example, running mail rules against the electronic message and scanning the electronic mail message for malicious programs.

During message pipeline development, developers typically have access to tools that allow virtually any functionality to be built-into a message processing pipeline. For example, if standards for a protocol are updated, a message processing pipeline can be re-designed to implement the updated standards. Thus, during development, message processing pipelines can be developed to include the latest electronic messaging technology. Accordingly, newer versions of email server software can, from time to time, be released such that electronic mail users can benefit from advancements in messaging technology.

However, while email users may require and/or desire a plethora of specialized features, email server software has been traditionally distributed as a "one size fits all" package. That is, electronic mail server software has been made available to computer users as a bundled package that includes all of the commands, features and formats of that specific system. Thus, when a user desires a specific command, function or format that is not included in the system package, for example, not included in a message processing pipeline, that user must frequently wait until the designer of the email server software includes the specialized feature in a newer version of the email package.

In the upgraded version, the new feature is generally bundled with a variety of other features. Thus, this traditional method for obtaining the desired feature forces users to upgrade the entire email server software package in order to pick up the incremental feature, and frequently requires users to receive features that are not desired or needed simply because they were bundled with the desired feature. This process of needing to upgrade the system in order to obtain a desired feature results in the consumption of large amounts of money and/or storage space for individuals and businesses.

Unfortunately, after email server software is released, it is difficult, if not impossible, to securely extend the functionality of the email server software. Users with significantly advanced technical skills may, to some extent, be able to design add-on modules to interact with the email server software, for example to interact with a message processing pipeline. However, there is now way to insure that an add-on module will appropriately interact with the email server software or that a designed module is not malicious (e.g., contains a Trojan Horse, virus, etc.). Thus, execution of an add-on module can, either intentionally or unintentionally, cause a message processing pipeline or other emails server software modules to fail. Accordingly, end-users may choose not to utilize add-on modules and may instead wait for the next version of the email server software.

Further, even if an add-on module is designed to appropriately interact with a message processing pipeline, installation of the add-on module may be difficult. For example, a user may be required to manipulate configuration settings of the email server software and run a number of patch programs to install the add-on module. Thus, installing an add-on module can be time consuming and many email users may lack required technical skills for performing such an installation. Further, it may be difficult, even for a technically proficient user, to identify the configuration settings that require manipulation and to identify the required patch programs.

Further, the inability to easily extend the functionality email server software, can prevent end-users from customizing a message processing pipeline to meet their particular needs. For example, a corporation may desire to extend message processing pipeline functionality to insure that electronic mail messages transferred through the message processing pipeline conform with unique corporate policies. However, since this functionality is limited to a small subset of customers (or single customer), it may be difficult to get the message processing pipeline developer to implement such functionality. Thus, the corporation may simply have no way to enforce the unique corporate polices on electronic mail messages (or is at least forced to wait for a newer version of the message processing pipeline). Therefore systems, methods, and computer program products that facilitate securely and efficiently extending data processing pipeline functionality would be advantageous.

BRIEF SUMMARY OF THE INVENTION

The foregoing problems with the prior state of the art are overcome by the principles of the present invention, which are directed towards methods, systems, and computer program products for securely and efficiently extending data processing pipeline functionality. In some embodiments, a data processing agent registers to manipulate data of a data processing pipeline. A computer system receives a self-contained assembly that contains instructions for implementing a data processing agent and that contains configuration data indicating how the data processing agent is to be configured. For example, the configuration data can identify a specified event the data processing agent is to hook into. The computer system stores the assembly at a specified location. The computer system detects an occurrence of an event and determines that the specified event is the detected event. The computer system is configured to implement the data processing agent in accordance with the contained configuration data. The computer system loads the data processing agent such that the instructions can be executed to manipulate data related to the detected event in accordance with the contained configuration data.

In other embodiments, the functionality of a data processing pipeline is extended. A computer system detects an occurrence of an event. The computer system determines that one or more data processing agents have registered for the detected event. The computer system loads each of the one or more data processing agents into a secure zone such that execution of each data processing agent is isolated from execution all other data processing agents. The computer system maps the detected event to a corresponding handler at each of the one or more data processing agents. The computer system transfers pipeline related data to each corresponding handler such that the one or more data processing agents can process the pipeline related data.

Application Program Interfaces ("APIs") can be used transfer data between modules that implement embodiments of the present invention. An Initialize API can be used to transfer a Server value, Configuration Setting values, and an Agent Group value, to computer-executable instructions for initializing an instance of an agent runtime engine. An Invoke API can be used to transfer an Execution Context value, an Event Identifier value, and List of Other Context values, to computer-executable instructions for invoking agents corresponding to an event. An Asynchronous Invoke API can be used to transfer an Execution Context value, an Event Identifier value, a Time Out value, a Callback value, a State Value, and List of Other Context values, to computer-executable instructions for a asynchronously invoking an agent corresponding to an event. An Event Handler API can be used to transfer an Event Source value and Event Argument values, to computer-executable instructions for executing a specified agent handler.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5 illustrates examples of Application Program Interfaces that can be called to transfer data between modules that implement embodiments of the present invention.

FIG. 6 illustrates a suitable operating environment for the principles of the present invention.

DETAILED DESCRIPTION OF THE PREFERRED EMBODIMENTS

Figure 1:
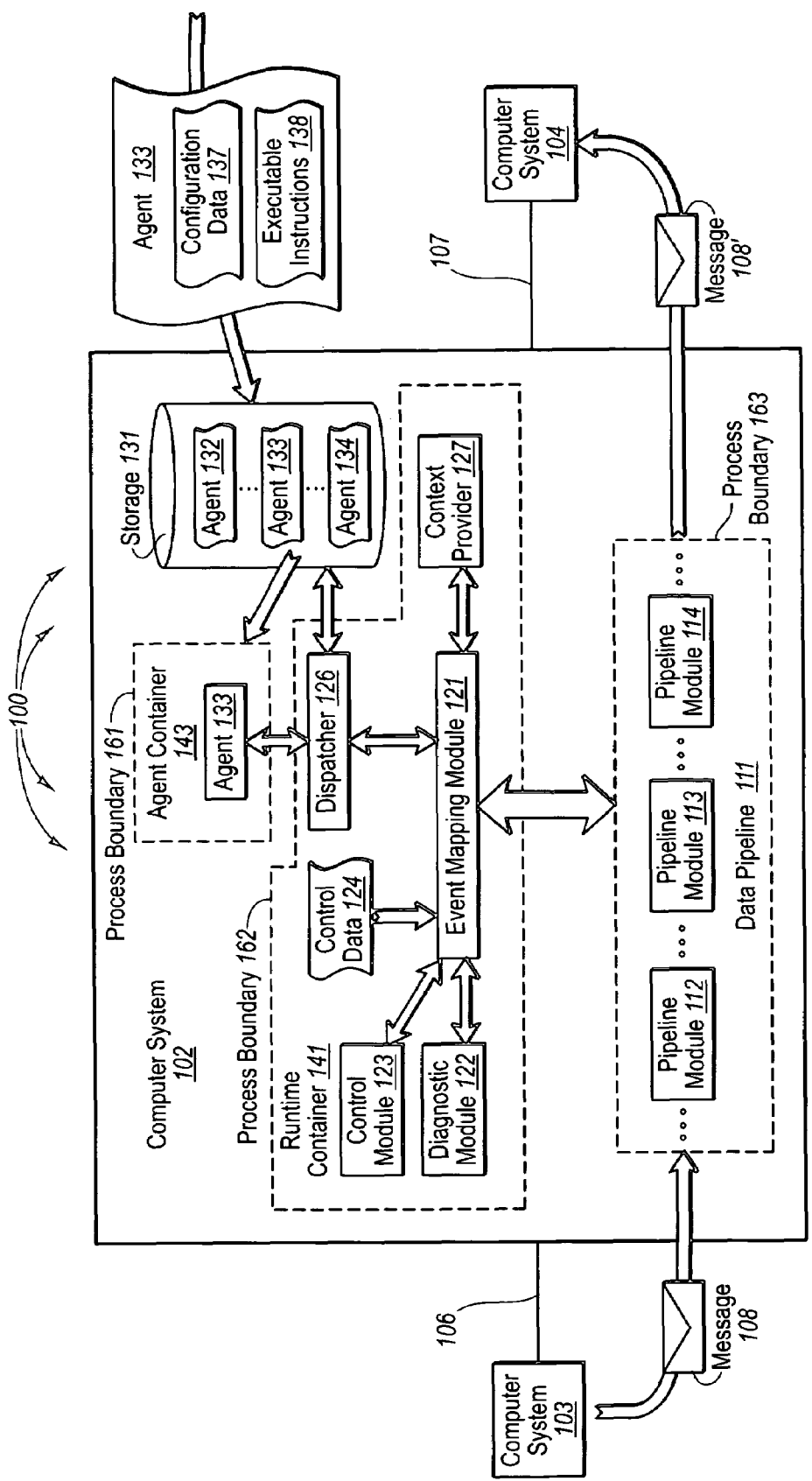
FIG. 1 illustrates an example of a computer architecture that registering a data processing agent to manipulate data of a data processing pipeline.

The principles of the present invention provide for securely and efficiently extending data processing pipeline functionality. In some embodiments, a data processing agent registers to manipulate data of a data processing pipeline. A computer system receives a self-contained assembly that contains instructions for implementing a data processing agent and that contains configuration data indicating how the data processing agent is to be configured. For example, the configuration data can identify a specified event the data processing agent is to hook into. The computer system stores the assembly at a specified location. The computer system detects an occurrence of an event and determines that the specified event is the detected event. The computer system is configured to implement the data processing agent in accordance with the contained configuration data. The computer system loads the data processing agent such that the instructions can be executed to manipulate data related to the detected event in accordance with the contained configuration data.

In other embodiments, the functionality of a data processing pipeline is extended. A computer system detects an occurrence of an event. The computer system determines that one or more data processing agents have registered for the detected event. The computer system loads each of the one or more data processing agents into a secure zone such that execution of each data processing agent is isolated from execution all other data processing agents. The computer system maps the detected event to a corresponding handler at each of the one or more data processing agents. The computer system transfers pipeline related data to each corresponding handler such that the one or more data processing agents can process the pipeline related data.

Application Program Interfaces ("APIs") can be used transfer data between modules that implement embodiments of the present invention. An Initialize API can be used to transfer a Server value, Configuration Setting values, and an Agent Group value, to computer-executable instructions for initializing an instance of an agent runtime engine. An Invoke API can be used to transfer an Execution Context value, an Event Identifier value, and List of Other Context values, to computer-executable instructions for invoking agents corresponding to an event. An Asynchronous Invoke API can be used to transfer an Execution Context value, an Event Identifier value, a Time Out value, a Callback value, a State Value, and List of Other Context values, to computer-executable instructions for a asynchronously invoking an agent corresponding to an event. An Event Handler API can be used to transfer an Event Source value and Event Argument values, to computer-executable instructions for executing a specified agent handler.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language or intermediate language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates registering a data processing agent to manipulate data of a data processing pipeline. Computer architecture 100 includes computer system 102 that can be connected to a network such as, for example, a Local Area Network ("LAN"), Wide Area Network ("WAN"), or even the Internet. Computer systems 103 and 104 can also be connected to the network. Computer systems 102, 103, and 104 can exchange message related data (e.g., included in Internet Protocol ("IP") datagrams and in accordance with other higher layer protocols that utilize IP datagrams, such as, Transmission Control Protocol ("TCP"), Hypertext Transfer Protocol ("HTTP"), Simple Mail Transfer Protocol ("SMTP"), Post Office Protocol ("POP"), Internet Message Access Protocol ("IMAP"), etc.) over the network. For example, each of computer systems 102, 103, and 104 can include electronic mail servers that transfer and process electronic mail messages. Links 106 and 107 indicate that computer system 102 is network connectable to computer systems 103 and 104.

As depicted in computer architecture 100, computer system 102 includes data pipeline 111, runtime container 141, and storage 131. Data pipeline 111 includes one or more data processing modules, such as, for example, pipeline modules 112, 113, and 114 that are configured to perform operations on message related data. Generally, an electronic message is (e.g., message 108) is received at one end of data pipeline 111 and corresponding message related data (e.g., the contents of message 108) is processed at each pipeline module.

For example, message 108 can be received at a first pipeline module (e.g., pipeline module 112), the first pipeline module can perform some message related processing (including the issuing of events), and message 108 can them be transferred to the next pipeline module (e.g., pipeline module 113). The next pipeline module can perform some message related processing (including the issuing of events), and message 108 can them be transferred to the next pipeline module. A horizontal series of three periods (an ellipsis) before, after, and between the expressly depicted pipeline modules 112, 113, and 114, indicates that one or more other pipeline modules can be included in data pipeline 111 before and/or after and/or between pipeline modules 112, 113, and 114. Processing implementing in pipeline components can modify an accessed message, for example, message 108' indicates that the processed message can differ from message 108.

Runtime container 141 includes event mapping module 121, diagnostic module 122, control module 123, control data 124, dispatcher 126, and context provider 127. Generally, event mapping module 121 interoperates with control module 123 and context provider 127 to provide dispatcher 126 the appropriate data for loading a data processing agent. Event mapping module 121 can monitor data pipeline 111 for the occurrence of events (e.g., issued form a pipeline module). When the occurrence of an event is detected, event mapping module 121 maps the event to the appropriate agent handlers. Event mapping can facilitate optimized execution of only appropriate agents that match an event. Event mapping module 121 can be configured in accordance with control data 124. Control data 124 can include data for configuring event mapping module 121 to store and read information related to specified data processing operations.

Control module 123 can enforce security and control restrictions on the execution of a data processing agent. For example, control module 123 can facilitate agent monitoring and assign agents to appropriate security zones or levels. Control module 123 can prevent unauthorized agent access to resources of computer system 102. For example, control module 123 can prevent an agent for utilizing memory outside an allocated range of memory.

Context provider 127 maps incoming message related data (e.g., contained in message 108) to a consistent internal data representation. Context provider 127 can thus provide a consistent view of message related data processed in pipeline 111, that is in compatible format for data processing agents. Providing a consistent view of message related data facilitates more efficient security checks. For example, control module 123 can be designed to process message related data that is presented in the consistent internal data representation.

Dispatcher 126 can install agents (e.g., from storage 131) into the memory of computer system 102. Dispatcher 124 can securely install agents in accordance with control and security restrictions imposed by control module 123. Dispatcher 126 can also pass the correct interfaces (e.g., APIs) to loaded agents.

Diagnostic module 122 can include one more modules for obtaining and storing diagnostic information related to agent execution. For example, diagnostic module 122 can include a Quality of Server ("QoS") module, a logging module, and a monitor module. A QoS module can facilitate monitoring resource (e.g., CPU, disk space, threads, etc.) usage of each installed agent. Thus, the QoS module can prevent an agent from causing resource shortages or from lowering the quality of computer system 102. A logging module can be utilized by agents or event mapping module 121 to log information for troubleshooting or other purposes. An agent monitor can be used by external processes or components to access modules in runtime container 141 for management purpose and to obtain state information. For example, through a user-interface of the agent monitor an administrator can monitor and manage modules contained in runtime container 141.

Storage 131 can store one or more agents (e.g., agents 132, 133, 134) that were copied from external locations (e.g., from other computer systems) to storage 131. A vertical series of three periods (a vertical ellipsis) before, after, and between the expressly depicted agents 132, 133, and 134, indicates that one or more other agents, in addition to agents 132, 133, and 134, can be stored in storage 131.

Generally, as depicted by the dashed lines runtime container 141, data pipeline 111, and agent container 143 are isolated from one another by process boundaries 162, 163 and 161 respectively. Thus, modules contained in runtime container 141, data pipeline 111, and agent container 143 are also isolated from one another and from other process of computer system 102. Generally, a process boundary prevents resources allocated to a process from interacting with other processes. Operating system ("OS") process boundaries and Common Language Runtime ("CLR") domains (or CLR processes) are examples of process boundaries. However, process boundaries can be implemented using a variety of mechanisms and embodiments of the present invention are not limited to any particular process boundary implementation.

Figure 3:
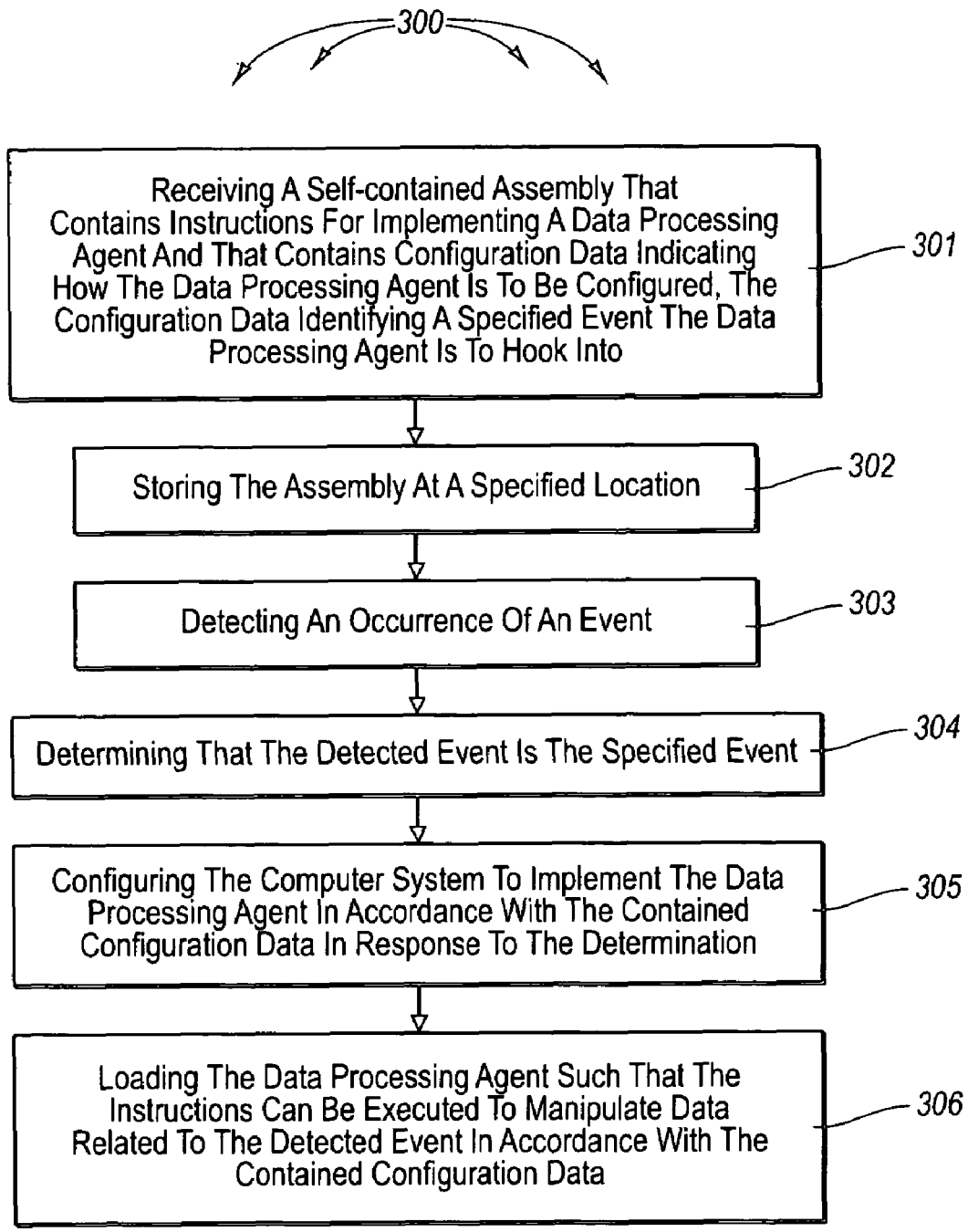
FIG. 3 illustrates an example flow chart of a method for registering a data processing agent to manipulate data of a data processing pipeline.

FIG. 3 illustrates an example flow chart of a method 300 for registering a data processing agent to manipulate data of a data processing pipeline. The method 300 will be described with respect to the data and modules of computer architecture 100.

Method 300 includes an act of receiving a self-contained assembly that contains instructions for implementing a data processing agent and that contains configuration data indicating how the data processing agent is to be configured (act 301). Configuration data can identify a specified event the data processing agent is to hook into. For example, agent 133 can be transferred form an external location to computer system 102. Agent 133 includes configuration data 137 and executable instructions 138. Configuration data 137 can include metadata that indicates how agent 133 is to be configured and/or installed, including identifying one or more events agent 133 is to hook into. Executable instructions 138 can include intermediate language instructions (e.g., compiled from source code of a common language runtime ("CLR") language, such as, for example, C++, C#, Visual Basic, etc.) for processing message related data.

Since agent 133 contains configuration data 137 there is little, if any, need for maintaining additional external configuration files data. Thus, agents are essentially self-configuring and installing. Accordingly, agents can be installed more efficiently and may be compatible in a variety of different computing environments.

Method 300 includes an act of storing the assembly at a specified location (act 302). For example, agent 133 can be stored at storage 131. Method 300 includes an act of detecting the occurrence of an event (act 303). For example, as message 108 is transferred through data pipeline 111, one or more of the corresponding pipelines modules (e.g., pipeline modules 112, 113, and 114) may issue events. Event mapping module 121 can detect the occurrence of an event and pass an indication of the event to dispatcher 126.

Method 300 includes an act of determining that the detected event is the specified event (act 304). For example, when dispatcher 126 receives an indication of an event, dispatcher 126 can scan storage 131 to identify agents that are to hook into the detected event. Dispatcher 126 can scan configuration data (e.g., metadata) contained in each stored agent and, based (potentially solely) on the configuration data, determine if an agent is to hook into the detected event.

In may be that each detected event is mapped to a specified topic string (either by event mapping module 121 or dispatcher 126). Agent developers can include specified topic strings within an agent (e.g., in metadata) to indicate one or more events the agent is to hook into. For example, the topic string "OnSessionStartEvent" to represent an event indicating the start of an SMTP session. Other topic strings, such as, for example, "OnDataCommand", "OnEhloCommand", "OnEndOfData", "OnEndOfHeaders", "OnHeloCommand", "OnHelpCommand", "OnMailCommand", "OnNoopCommand", "OnRcptCommand", "OnReject", "OnRsetCommand", "OnSessionStopEvent", "OnCategorization", "OnDeleteMailItem", "OnPostCategorization", "OnSubmit", "OnPerRecipient", "OnAuthCommand", can also be used to represent a corresponding event indicating or related to other (e.g., required, optional, or vendor specific) SMTP commands (e.g., verbs or keywords). Other topic strings can be used to represent Extended Simple Mail Transfer Protocol ("ESMTP") keywords and verbs. Additional topic strings can be used to represent other events issued by pipeline modules of data pipeline 111.

Thus, dispatcher 126 can scan configuration data contained in stored agents to identify topic strings contained in agents and determine if identified topic strings match the topic string corresponding to a detected event. A match indicates to dispatcher 126 that an agent containing the topic string is to hook into the detected event.

Method 300 includes an act of configuring the computer system to implement the data processing agent in accordance with the contained configuration data in response to the determination (act 305). For example, control module 123, event mapping module 121, and dispatcher 126 can configure computer system 102 to implement agent 133 in accordance with configuration data 137. Configuring computer system 102 can include allocating system resources (e.g., system memory and process resources) for use by agent 133.

Method 300 includes an act of loading the data processing agent such that the instructions can be executed to manipulate data related to the detected event in accordance with the contained configuration data (act 306). For example, dispatcher 126 can load agent 133 into the system memory of computer system 102. Agent container 143 logical represents that agent 133 is restricted to accesses only specifically allocated system resources. Dispatcher 126 can interact with control module 123, through event mapping module 121, to appropriately allocate resources to agent 133. For example, agent container 143 can limit agent 133 to specified portions of memory and CPU resources. The resources of container 143 can be isolated form other processes running at computer system 102 such that inappropriate operation by agent 133 does not interrupt other processes or cause other processes to fail. The security and control associated with agent container 143 can be dictated by control module 123.

Accordingly, agents can be efficiently and securely loaded without reference to external consideration files.

Figure 2:
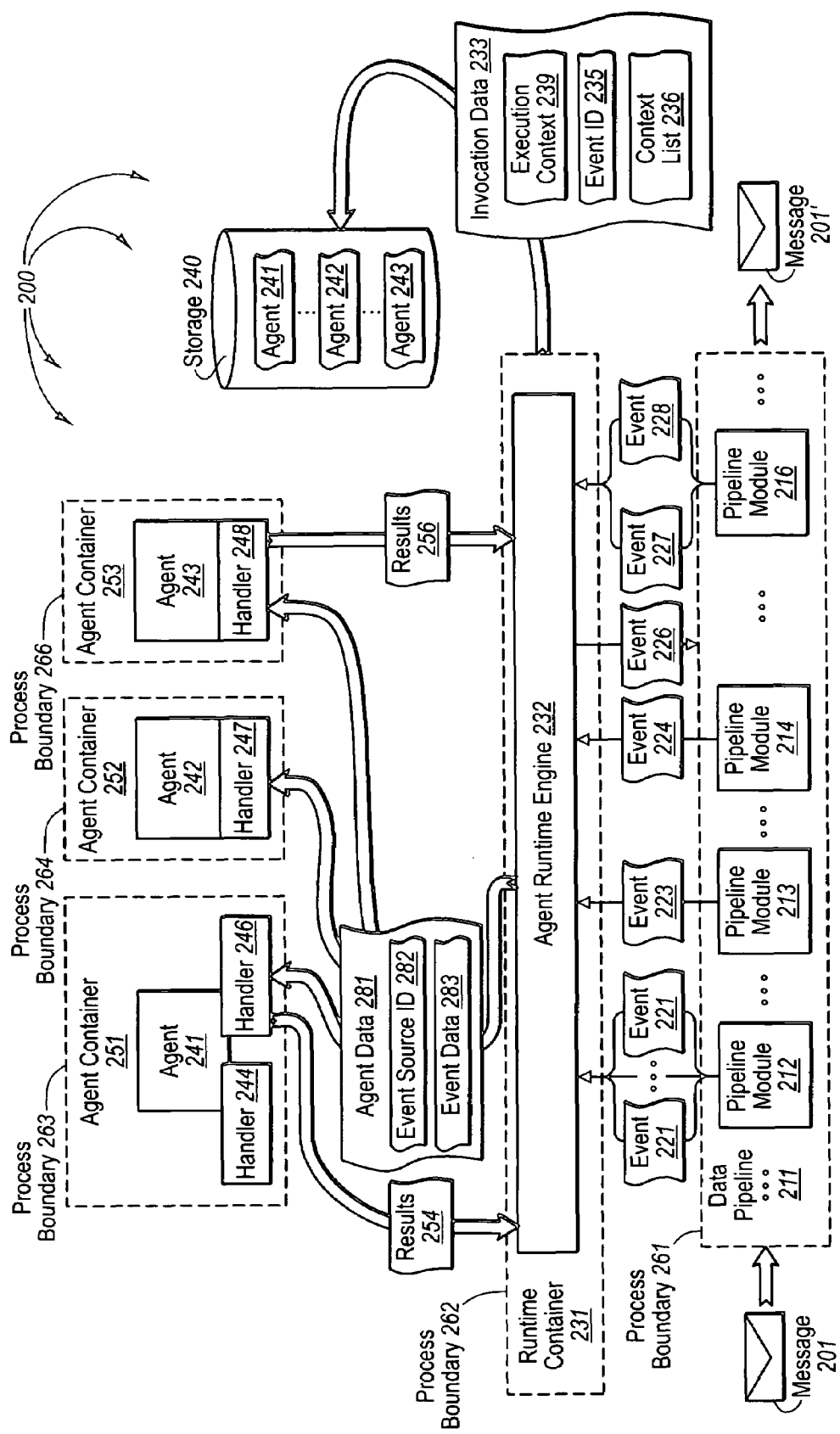
FIG. 2 illustrates an example of a computer architecture that facilitates extending the functionality of a data processing pipeline.

Referring now to FIG. 2, FIG. 2 illustrates an example of a computer architecture 200 that facilitates extending the functionality of a data processing pipeline. As depicted in computer architecture 200, data pipeline 211 includes one or more data processing modules, such as, for example, pipeline modules 212, 213, 214, and 216 that are configured to perform some function related to accessed message related data. Generally, an electronic message is (e.g., message 201) is received at one end of data pipeline 211 and corresponding message related data is processed at each pipeline module.

For example, message 201 can be received at a first pipeline module (e.g., pipeline module 212), the first pipeline module can perform some message related processing (including the issuing of events), and message 201 can then be transferred to the next pipeline module (e.g., pipeline module 213). The next pipeline module can perform some message related processing (including the issuing of events), and message 108 can them be transferred to the next pipeline module. A horizontal series of three periods (an ellipsis) before, after, and between the expressly depicted pipeline modules 212, 213, 214, and 216 indicates that one or more other pipeline modules can be included in data pipeline 211 before and/or after and/or between pipeline modules 212, 213, 214, and 216. Pipeline components can modify a received message, for example, message 201' indicates that the processed message can differ from message 201.

Pipeline modules 212, 213, 214, and 216 can each be configured to issue one or more events related to processing a message. For example, pipelines modules 212, 213, 214, and 216 can issue events 221 through 222, 223, 224, and 227 and 228 respectively. The ellipsis between event 221 and event 222 indicates that one or more other events can be issued by pipeline module 213. Each of the events may be related to establishing a connection (e.g., an SMTP connection) for receiving/sending an electronic message or performing other operations on message related data (e.g., scanning for Viruses, categorization, forwarding, etc.). Events can also be user-defined and/or vendor specific for performing specified messaging operations. Agent runtime engine 232 can monitor data pipeline 211 for events and can load appropriate agents in response to detected events.

Runtime container 231 includes agent runtime engine 232. Agent runtime engine 232 can include one or more of the modules included in runtime container 141. Accordingly, agent runtime engine 232 can load agents, intercept invents, and transfer appropriate message related data to agents.

Storage 240 can store one or more agents (e.g., agents 241, 242, 243) that were copied from external locations (e.g., from other computer systems) to storage 240. A vertical series of three periods (a vertical ellipsis) before, after, and between the expressly depicted agents 241, 242, and 243, indicates that one or more other agents, in addition to agents 241, 242, and 243, can be stored in storage 240. Each agent stored at storage 240, can include one or more handlers corresponding to one or more events. Thus, it may be that an agent is configured to perform plurality of different actions related to a corresponding plurality of different events. For example, an agent can include a handler for performing an action related to the SMTP HELO verb and also include a handler for performing an action related to the SMTP AUTH verb. Accordingly, the agent may be loaded upon the occurrence of an event related to the HELO or AUTH verbs.

As depicted in computer architecture 200, agents 241, 242, and 243 have been loaded into corresponding agent containers 251, 252, and 253 respectively. Each of the agents may have a handler that corresponds to a detected event. For example, handlers 246, 247, and 248 may correspond to event 224.

Generally, as depicted by the dashed lines, agent containers 251, 252, and 253 are isolated from one another as well as from runtime container 231 and data pipeline 211 by corresponding process boundaries 263, 264, 266, 262, and 261 respectively. Each agent container 251, 252, and 253 can be allocated specified resources (e.g., memory, CPU, storage, etc) that are not used by other processes. Thus, if an agent malfunctions, there is a reduced likelihood of the malfunction adversely affecting other agents, agent runtime engine 232, or any pipeline modules and vice versa. For example, while a malfunction of agent 241 may corrupt resources allocated to agent container 251, it is unlikely the malfunction of agent 241 would corrupt resources in agent container 252, agent container 253, runtime container 231, or data pipeline 211. A control module (e.g., control module 123) can dictate resource allocation and establish process boundaries for agents.

Agent runtime engine 232 can also inject events back into data pipeline. Injected events can cause pipeline modules to perform operations on message related data. In some embodiments, agent runtime engine 232 injects events in response to a previously received event. For example, agent runtime engine 232 can inject event 226 in response to receiving event 224. In other embodiments, agent runtime engine 232 injects events in response to results from an agent. For example, agent runtime engine 232 can inject event 226 in response to results 254. Thus, either agent runtime engine 232 or an agent can cause an event to be injected into data pipeline 211.

Figure 4:
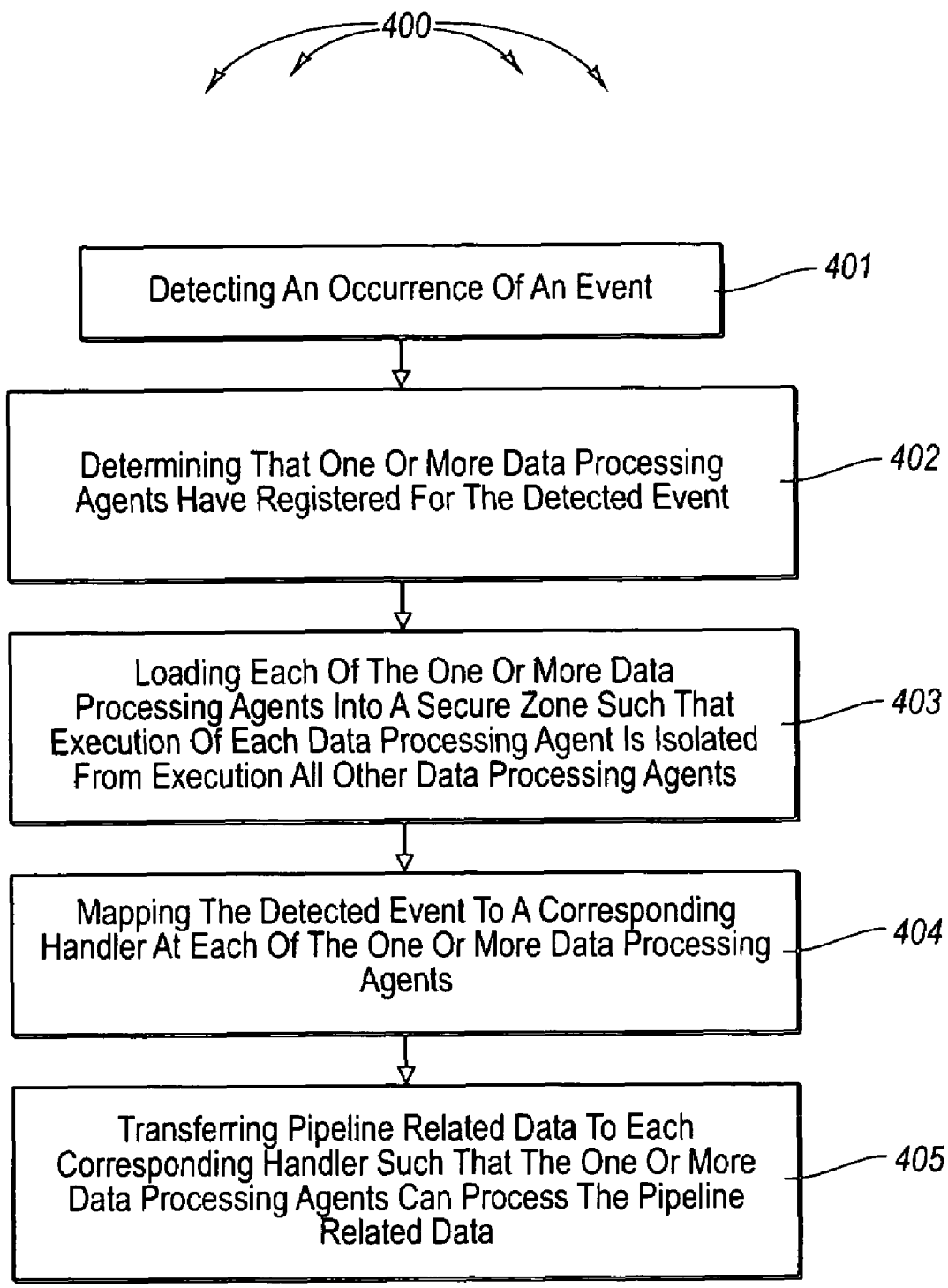
FIG. 4 illustrates an example flow chart of a method for extending the functionality of a data processing pipeline.

FIG. 4 illustrates an example flow chart of a method 400 for extending the functionality of a data processing pipeline. The method 400 will be described with respect to the components and data in computer architecture 200.

Method 400 includes an act of detecting an occurrence of an event (act 401). For example, agent runtime engine 232 can detect an occurrence of one of the events, 221 through 222, 223, 224, and 227 and 228. Method 400 includes an act of determining that one or more data processing agents have registered for the detected event (act 402). For example, agent runtime engine 232 can scan configuration data contained in agents stored at storage 240. When contained configuration data indicates that an agent is to hook into the detected event (e.g., when topic strings match), the agent is loaded.

Method 400 includes an act of loading each of the one or more data processing agents into a secure zone (act 403). Loading agents into secure zones causes the execution of each data processing agent to be isolated from execution all other data processing agents. For example, runtime agent engine 232 can issue invocation data 233 that causes agents 241, 242; and 243 to be loaded into corresponding agent containers 251, 252, and 253 respectively. Process boundaries 263, 264, and 266 isolate agents 241, 242 and 243 from one another. As previously described, a control module (e.g., control module 123) can dictate resources that are allocated to agent containers.

Invocation data 233 includes execution context 239, event ID 235, and context list 236, which can each include one or more name/value pairs. Invocation data 233 is utilized to appropriately load registered agents. For example, execution context 239 can include a value created by agent runtime engine 232 to keep track of per session information related to loaded agents. Event ID 235 can include a value (e.g., a topic string) indicating the type of the detected event. Context list 236 contains a list of data and/or objects from data-pipeline 211.

Method 400 includes an act of mapping the detected event to a corresponding handler at each of the one or more data processing agents (act 404). For example, agent runtime engine 232 can map a detected occurrence of one of the events 221 through 222, 223, 224, and 227 and 228 to a handler at each loaded agent (e.g., to handlers 246, 247, and 248). An event mapping module (e.g. event mapping module 121) can interoperate with a dispatcher (e.g., dispatcher 126) to appropriately map an event.

Method 400 includes an act of transferring pipeline related data to each corresponding handler such that the one or more data processing agents can process the pipeline related data (act 405). For example, agent runtime engine 232 can transfer agent data 281 to handlers 246, 247, and 248. Agent data 281 includes event source ID 282 and event data 283, which can each include one or more name/value pairs. Event source ID 282 can include a value (e.g., a topic string) indicating the type of the detected event. Event data 283 can include one or more portions of message related data (e.g., the contents or headers of message 201) that are used as processing input for loaded agents.

Accordingly, pipeline functionality is efficiently and securely extended.

Agents can return processing results (e.g., categorizing an electronic mail message, appending disclaimers to messages, indicates of viruses, etc). For example, agents 241 and 243 can return corresponding results 254 ad 256 respectively to agent runtime engine 232. In response to receiving results 254 and/or 256 agent runtime 232 can inject event 226 into data pipeline 211.

Application Program Interfaces ("APIs") can be used transfer data between modules that implement embodiments of the present invention. FIG. 5 depicts some of the APIs that can be used. API 501 generally represents an Initialize API for initializing an agent runtime engine. API 501 can be used to transfer a server identifier specifying a server object that is to be associated with the agent runtime engine, a configuration file identifier specifying a configuration file having configuration data for initializing the agent runtime engine, and an agent group identifier specifying a portion of the configuration file. The transferred server identifier, configuration file identifier, and agent group identifier can be QoX supplied as input to computer executable-instructions that initialize an agent runtime engine (e.g., agent runtime engine 232). More specifically, an Initialize API can be of the format:

```
/// Initializes the agent runtime instance.
/// <param name="server">
/// Specifies a server object the agent runtime is associated with.
/// </param>
/// <param name="configFile">
/// Specifies a configuration file.
/// </param>
/// <param name="agentGroup">
/// Specifies an agent group section id in the configuration file.
/// </param>
void Initialize(IServer server, string configFile, string agentGroup)
   {
      ///computer-executable instructions for initializing an agent
      runtime engine
   }
```

Where a sequence of three '/'s indicate a comment. An IServer data type can include data fields (e.g., of a data structure) for identifying a server object.

API 502 generally represents an Invoke API for invoking agents. API 502 can be used to transfer an execution context to keep track of per session information related to agents, an Event topic (e.g., a topic string) denoting a type of event, and a context list including a list of data and/or objects in a data processing pipeline. The transferred execution context, event topic, and context list can be supplied as input to computer executable-instructions that invoke an agent (e.g., agents 241, 242, and 243). More specifically, an Invoke API can be of the format:

```
/// Invoke agent runtime to execute agent handlers with the specific topic
/// <param name="executionContext">
/// an execution context object
/// </param>
/// <param name="eventTopic">
/// a string to denote the type of event
/// </param>
/// <param name="contexts">
/// a list of contexts
/// </param>
InvokeStatusCode Invoke(IExecutionContext executionContext,
            string eventTopic,
```

```
        params object[ ] contexts)
{
    ///computer-executable instructions for agent runtime to execute
    agent
    ///handlers with the specific topic
}
```

An IExecutionContext data type can include data fields for identifying an execution context. An execution context can be created by an agent runtime to keep track of per session information related to agents. A context list can include or identify data or objects from a data processing pipeline (e.g., SmtpCommand, SmtpResponse etc.)

API 503 generally represents an Asynchronous Begin Invoke API for asynchronous invoking agents to execute agent handlers with a specific topic. API 503 can be used to transfer an execution context to keep track of per session information related to agents, an event topic (e.g., a topic string) denoting a type of event, a time out value indicating when to terminate waiting for a response, a callback indicating an object to be called when the read is complete, state distinguishing an asynchronous read request for other read requests, and a context list including a list of data and/or objects in a data processing pipeline. The transferred execution context, event topic, time out value, callback, state, and context list can be supplied as input to computer-executable instructions that asynchronously invoke an agent (e.g., agents 241, 242, and 243) with a specific topic. More specifically, an Asynchronous Begin Invoke API can be of the format:

```
/// Begins an asynchronous invoke operation to execute agent handlers
with a specific
/// topic.
/// <param name="executionContext">
/// an execution context object
/// </param>
/// <param name="eventTopic">
/// a string to denote if the type of event
/// </param>
/// <param name="millisecondsTimeout">
/// a timeout value in milliseconds
/// </param>
/// <param name="callback">
/// An optional asynchronous callback, to be called when the
/// read is complete.
/// </param>
/// <param name="state">
/// A user-provided object that distinguishes this particular
/// asynchronous read request from other requests.
/// </param>
/// <param name="contexts">
/// a list of contexts
/// </param>
IAsyncResult BeginInvoke(IExecutionContext executionContext,
            string eventTopic,
            int millisecondsTimeout,
            AsyncCallback callback,
            object state,
            params object[ ] contexts)
{
    ///computer-executable instructions for asynchronously invoking
    an agent
    ///with a specific topic
}
```

An AsyncCallback data type can include data fields for identifying an object that is to be called back when the read is complete. An object data type can include data fields for distinguishing a read request form other read requests.

API 504 generally represents a Handler API for calling an agent handler. API 504 can be used to transfer an event source identifier (e.g., the SMTP verb that caused the event) and event data (e.g., message related data) to be processed by the handler. The transferred event source identifier and event data can be supplied as input to computer-executable instructions that call an agent handler (e.g., handlers 244, 246, 247, and 248). More specifically, a Handler API can be of the format:

```
/// AuthCommandEvent delegate
public delegate void AuthCommandEventHandler(
    ReceiveCommandEventSource source,
    Smtp.AuthCommandEventArgs e)
{
    ///computer-executable instructions for calling an Authorization
    Command
    ///event handler
}
```

A ReceiveCommandEventSource data type can include data fields for identifying the source of an event (e.g., an SMTP SESSION verb) and, in this example API, a Smtp.AuthCommandEventArgs data type includes data fields for data related to the SMTP AUTH verb. However, other data types, such as, for example, Smtp.DataCommandEventArgs, Smtp.EndOfataEventArgs, Smtp.HeloCommandEventArgs, Smtp.MailCommandEventArgs, Smtp.RcptCommandEventArgs, Smtp.EhloCommandEventArgs, Smtp.EndOfeadersEventArgs, Smtp.HelpCommandEventArgs, Smtp.NoopCommandEventArgs, Smtp.RejectEventArgs, Smtp.RsetCommandEventArgs, can be used to transfer data related to other corresponding SMTP verbs or keywords. Additionally, other data types can be used to transfer data related to ESMTP verbs and keywords and other events in a data processing pipeline.

It should be understood that the expressly described APIs, data, and data types are merely examples of some of the APIs, data, and data types that can be used to implement the present invention. It would be apparent to one skilled in the art, after having reviewed this description, that other APIs and/or data and/or data types, in addition to those expressly described, can be used to implement the present invention. For example, other data types can include integers, floating point, hexadecimal, octal, binary, logical, character, or even user-defined data structures.

FIG. 6 illustrates a suitable operating environment for the principles of the present invention. FIG. 6 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 6, an example system for implementing the invention includes a general-purpose computing device in the form of computer system 620, including a processing unit 621, a system memory 622, and a system bus 623 that couples various system components including the system memory 622 to the processing unit 621. Processing unit 621 can execute computer-executable instructions designed to implement features of computer system 620, including features of the present invention. The system bus 623 may be any of several types of bus structures including a memory bus or memory controller, a peripheral bus, and a local bus using any of a variety of bus architectures. The system memory includes read only memory ("ROM") 624 and random access memory ("RAM") 625. A basic input/output system ("BIOS") 626, containing the basic routines that help transfer information between elements within computer system 620, such as during start-up, may be stored in ROM 624.

The computer system 620 may also include magnetic hard disk drive 627 for reading from and writing to magnetic hard disk 639, magnetic disk drive 628 for reading from or writing to removable magnetic disk 629, and optical disk drive 630 for reading from or writing to removable optical disk 631, such as, or example, a CD-ROM or other optical media. The magnetic hard disk drive 627, magnetic disk drive 628, and optical disk drive 630 are connected to the system bus 623 by hard disk drive interface 632, magnetic disk drive-interface 633, and optical drive interface 634, respectively. The drives and their associated computer-readable media provide non-volatile storage of computer-executable instructions, data structures, program modules, and other data for the computer system 620. Although the example environment described herein employs magnetic hard disk 639, removable magnetic disk 629 and removable optical disk 631, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 639, magnetic disk 629, optical disk 631, ROM 624 or RAM 625, including an operating system 635, one or more application programs 636, other program modules 637, and program data 638. A user may enter commands and information into computer system 620 through keyboard 640, pointing device 642, or other input devices (not shown), such as, for example, a microphone, joy stick, game pad, scanner, or the like. These and other input devices can be connected to the processing unit 621 through input/output interface 646 coupled to system bus 623. Input/output interface 646 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 647 or other display device is also connected to system bus 623 via video interface 648. Other peripheral output devices (not shown), such as, for example, speakers and printers, can also be connected to computer system 620.

Computer system 620 is connectable to networks, such as, for example, an office-wide or enterprise-wide computer network, a home network, an intranet, and/or the Internet. Computer system 620 can exchange data with external sources, such as, for example, remote computer systems, remote applications, and/or remote databases over such networks.

Computer system 620 includes network interface 653, through which computer system 620 receives data from external sources and/or transmits data to external sources. As depicted in FIG. 6, network interface 653 facilitates the exchange of data with remote computer system 683 via link 651. Network interface 653 can logically represent one or more software and/or hardware modules, such as, for example, a network interface card and corresponding Network Driver Interface Specification ("NDIS") stack. Link 651 represents a portion of a network (e.g., an Ethernet segment), and remote computer system 683 represents a node of the network.

Likewise, computer system 620 includes input/output interface 646, through which computer system 620 receives data from external sources and/or transmits data to external sources. Input/output interface 646 is coupled to modem 654 (e.g., a standard modem, a cable modem, or digital subscriber line ("DSL") modem) via link 652, through which computer system 620 receives data from and/or transmits data to external sources. As depicted in FIG. 6, input/output interface 646 and modem 654 facilitate the exchange of data with remote computer system 693 via link 652. Link 652 represents a portion of a network and remote computer system 493 represents a node of the network.

While FIG. 6 represents a suitable operating environment for the present invention, the principles of the present invention may be employed in any system that is capable of, with suitable modification if necessary, implementing the principles of the present invention. The environment illustrated in FIG. 6 is illustrative only and by no means represents even a small portion of the wide variety of environments in which the principles of the present invention may be implemented.

In accordance with the present invention, modules including control modules, diagnostic modules, dispatchers, event mapping modules, context provider modules, agents, agent handlers, agent runtime engines, and pipeline modules as well as associated data, including electronic messages, events, control data, agents, invocation data, agent data, and results can be stored and accessed from any of the computer-readable media associated with computer system 620. For example, portions of such modules and portions of associated program data may be included in operating system 635, application programs 636, program modules 637 and/or program data 638, for storage in system memory 622.

When a mass storage device, such as, for example, magnetic hard disk 639, is coupled to computer system 620, such modules and associated program data may also be stored in the mass storage device. In a networked environment, program modules depicted relative to computer system 620, or portions thereof, can be stored in remote memory storage devices, such as, system memory and/or mass storage devices associated with remote computer system 683 and/or remote computer system 693. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A computer program product for use at a computer system, the computer system including a data pipeline comprising a sequential arrangement of a plurality of pipeline modules, an electronic message received at the data pipeline being sequential processed by pipeline modules such that the output of at least one pipeline module is the input to the next sequential pipeline module, the computer program product for implementing a method for invoking an agent runtime to customize the functionality of a data pipeline, the computer program product comprising computer-readable storage medium having stored thereon computer-executable instructions that, when executed by a processor, cause the computer system to perform the method, including the following:

receive electronic message related data at a pipeline module in the sequential arrangement of pipeline modules;

detect the occurrence of an event at the pipeline module in response to processing the electronic message related data at the pipeline module;

mapping the detected event to a specified topic string representing an electronic messaging command;

scan configuration data for stored agents to attempt to identify any stored agents having topic strings corresponding to the specified topic string;

indentify an agent having a topic string corresponding to the specified topic string, the agent having the corresponding topic string indicating that the agent is self-configured to hook into the detected event;

loading the identified agent such that the identified agent can be executed to manipulate messaging data associated with the detected event in accordance with the configuration data for the identified agent, loading the identified agent including supplying appropriate values to an invoke API to invoke the identified agent, supplying appropriate values including supplying values for:

an execution context field for storing an execution context value that identifies an execution context object for an agent runtime;

an event topic field for storing an event topic value that represents a type of event that is to be processed by the agent runtime in the execution context object identified by the execution context value stored in the execution context field;

a contexts field for storing a list of context values that represent a corresponding list of objects from a data processing pipeline that can be accessed from the execution context object identified by the execution context value stored in the execution context field;

divert pipeline data related to the represented messaging command out of the data pipeline to the identified agent to extend the functionality of the data pipeline subsequent to loading the agent; and inject results from the identified agent back into the data pipeline for further processing.

2. The computer program product as recited in claim 1, wherein the execution context field for storing an execution context value comprises an execution context field for storing per session information related to agents.

3. The computer program product as recited in claim 1, wherein the event topic field for storing an event topic value comprises an event topic field for storing an event topic string that identifies a type of event.

4. The computer program product as recited in claim 3, wherein the event topic field for storing an event topic string that identifies a type of event comprises an event topic field for storing an event topic string that identifies an SMTP verb.

5. The computer program product as recited in claim 3, wherein the event topic field for storing an event topic string that identifies a type of event comprises an event topic field for storing an event topic string that identifies an SMTP keyword.

6. The computer program product as recited in claim 3, wherein the event topic field for storing an event topic string that identifies a type of event comprises an event topic field for storing an event topic string that identifies an event from the data processing pipeline.

7. The computer program product as recited in claim 3, wherein the event topic field for storing an event topic string that identifies a type of event comprises an event topic field for storing an event topic string that identifies an user-defined event for performing a specified messaging operation.

8. The computer program product as recited in claim 1, wherein the contexts field for storing a list of context values comprises a contexts field for storing a list of objects corresponding to SMTP verbs.

9. The computer program product as recited in claim 1, wherein the contexts field for storing a list of context values comprises a contexts field for storing a list of objects corresponding to SMTP keywords.

10. The computer program product as recited in claim 1, wherein the contexts field for storing a list of context values comprises a contexts field for storing an object corresponding to a user-defined event.

11. A computer program product for use at a computer system, the computer system including a data pipeline comprising a sequential arrangement of a plurality of pipeline modules, an electronic message received at the data pipeline being sequential processed by pipeline modules such that the output of at least one pipeline module is the input to the next sequential pipeline module, the computer program product for implementing a method for invoking an agent runtime to customize the functionality of a data pipeline, the computer program product comprising computer-readable storage medium having stored thereon computer-executable instructions that, when executed by a processor, cause the computer system to perform the method, including the following:

receive electronic message related data at a pipeline module in the sequential arrangement of pipeline modules;

detect the occurrence of an event at the pipeline module in response to processing the electronic message related data at the pipeline module;

mapping the detected event to a specified topic string representing an electronic messaging command;

scan configuration data for stored agents to attempt to identify any stored agents having topic strings corresponding to the specified topic string;

indentify an agent having a topic string corresponding to the specified topic string, the agent having the corresponding topic string indicating that the agent is self-configured to hook into the detected event;

asynchronously invoke the identified agent such that the identified agent can be executed to manipulate data related to the detected event in accordance with the configuration data for the identified agent, asynchronously invoking the identified agent including supplying appropriate values to an invoke API for the identified agent, supplying appropriate values including supplying values for;

an execution context field for storing an execution context value that identifies an execution context object for an agent runtime;

an event topic field for storing an event topic value that represents a type of event that is to be processed by the agent runtime in the execution context object identified by the execution context value stored in the execution context field;

a time out field for storing a time out value that represents an amount of time after which the attempt to asynchronously invoke an agent runtime will time out;

a callback field for storing a callback value that represents an object to be called when the asynchronous invocation of the agent runtime is complete;

a state field for storing a state value that distinguishes the asynchronous invocation of the agent runtime from other invocations of the agent runtime; and a contexts field for storing a list of context values that represent a corresponding list of objects from a data processing pipeline that can be accessed from the execution context object identified by the execution context value stored in the execution context field;

divert pipeline data related to the represented messaging command out of the data pipeline to the identified agent to extend the functionality of the data pipeline subsequent to loading the agent; and inject results from the identified agent back into the data pipeline for further processing.

12. The computer program product as recited in claim 11, wherein the execution context field for storing an execution context value comprises an execution context field for storing per session information related to agents.

13. The computer program product as recited in claim 11, wherein the event topic field for storing an event topic value comprises an event topic field for storing an event topic string that identifies a type of event.

14. The computer program product as recited in claim 11, wherein the time out field for storing a time out value comprises a time out field for storing a time out value in milliseconds.

15. The computer program product as recited in claim 11, wherein state field for storing a state value comprises a state field for storing a user-defined object.

16. The interface computer program product as recited in claim 11, where the contexts field for storing a list of context values comprises a contexts field for storing a list of objects corresponding to SMTP verbs.

17. The computer program product as recited in claim 11, where the contexts field for storing a list of context values comprises a contexts field for storing a list of objects corresponding to SMTP keywords.

18. The computer program product as recited in claim 11, where the contexts field for storing a list of context values comprises a contexts field for storing an object corresponding to a user-defined event.

19. At a computer system, the computer system including a processor and system memory, the computer system also including a data pipeline comprising a sequential arrangement of a plurality of pipeline modules, an electronic message received at the data pipeline being sequential processed by pipeline modules such that the output of at least one pipeline module is the input to the next sequential pipeline module, a method for invoking an agent runtime to customize the functionality of a data pipeline, the method comprising:

receiving electronic message related data at a pipeline module in the sequential arrangement of pipeline modules;

detecting the occurrence of an event at the pipeline module in response to processing the electronic message related data at the pipeline module;

mapping the detected event to a specified topic string representing an electronic messaging command;

scanning configuration data for stored agents to attempt to identify any stored agents having topic strings corresponding to the specified topic string;

indentifying an agent having a topic string corresponding to the specified topic string, the agent having the corresponding topic string indicating that the agent is self-configured to hook into the detected event;

the processor loading the identified agent such that the identified agent can be executed to manipulate messaging data associated with the detected event in accordance with the configuration data for the identified agent, loading the identified agent including supplying appropriate values to an invoke API to invoke the identified agent, supplying appropriate values including supplying values for:

an execution context field for storing an execution context value that identifies an execution context object for an agent runtime;

an event topic field for storing an event topic value that represents a type of event that is to be processed by the agent runtime in the execution context object identified by the execution context value stored in the execution context field;

a contexts field for storing a list of context values that represent a corresponding list of objects from a data processing pipeline that can be accessed from the execution context object identified by the execution context value stored in the execution context field;

diverting pipeline data related to the represented messaging command out of the data pipeline to the identified agent to extend the functionality of the data pipeline subsequent to loading the agent; and injecting results from the identified agent back into the data pipeline for further processing.

20. The method as recited in claim 19, wherein the execution context field for storing an execution context value comprises an execution context field for storing per session information related to agents.

21. The method as recited in claim 19, wherein the event topic field for storing an event topic value comprises an event topic field for storing an event topic string that identifies a type of event.

22. The method as recited in claim 21, wherein the event topic field for storing an event topic string that identifies a type of event comprises an event topic field for storing an event topic string that identifies an SMTP verb.

23. The method as recited in claim 21, wherein the event topic field for storing an event topic string that identifies a type of event comprises an event topic field for storing an event topic string that identifies an SMTP keyword.

24. The method as recited in claim 19, wherein the contexts field for storing a list of context values comprises a contexts field for storing a list of objects corresponding to SMTP verbs.

25. The method as recited in claim 19, wherein the contexts field for storing a list of context values comprises a contexts field for storing a list of objects corresponding to SMTP keywords.

26. At a computer system, the computer system including a processor and system memory, the computer system also including a data pipeline comprising a sequential arrangement of a plurality of pipeline modules, an electronic message received at the data pipeline being sequential processed by pipeline modules such that the output of at least one pipeline module is the input to the next sequential pipeline module, a method for invoking an agent runtime to customize the functionality of a data pipeline, the method comprising:

receiving electronic message related data at a pipeline module in the sequential arrangement of pipeline modules;

detecting the occurrence of an event at the pipeline module in response to processing the electronic message related data at the pipeline module;

mapping the detected event to a specified topic string representing an electronic messaging command;

scanning configuration data for stored agents to attempt to identify any stored agents having topic strings corresponding to the specified topic string;

indentifying an agent having a topic string corresponding to the specified topic string, the agent having the corresponding topic string indicating that the agent is self-configured to hook into the detected event;

the processor asynchronously invoking the identified agent such that the identified agent can be executed to manipulate data related to the detected event in accordance with the configuration data for the identified agent, asynchronously invoking the identified agent including supplying appropriate values to an invoke API for the identified agent, supplying appropriate values including supplying values for:

an execution context field for storing an execution context value that identifies an execution context object for an agent runtime;

an event topic field for storing an event topic value that represents a type of event that is to be processed by the agent runtime in the execution context object identified by the execution context value stored in the execution context field;

a time out field for storing a time out value that represents an amount of time after which the attempt to asynchronously invoke an agent runtime will time out;

a callback field for storing a callback value that represents an object to be called when the asynchronous invocation of the agent runtime is complete;

a state field for storing a state value that distinguishes the asynchronous invocation of the agent runtime from other invocations of the agent runtime; and a contexts field for storing a list of context values that represent a corresponding list of objects from a data processing pipeline that can be accessed from the execution context object identified by the execution context value stored in the execution context field;

diverting pipeline data related to the represented messaging command out of the data pipeline to the identified agent to extend the functionality of the data pipeline subsequent to loading the agent; and injecting results from the identified agent back into the data pipeline for further processing.

27. The method as recited in claim 26, wherein the time out field for storing a time out value comprises a time out field for storing a time out value in milliseconds.

28. The method as recited in claim 26, wherein the contexts field for storing a list of context values comprises a contexts field for storing a list of objects corresponding to SMTP verbs.

29. The method as recited in claim 28, wherein the contexts field for storing a list of objects corresponding to SMTP verbs comprises a contexts field for storing a list of objects corresponding to SMTP verbs selected from among: DATA, HELO, MAIL, NOOP, QUIT, RCPT, RSET, and VRFY SMTP verbs.

30. The method as recited in claim 26, wherein the contexts field for storing a list of context values comprises a contexts field for storing a list of objects corresponding to SMTP keywords.

* * * * *

UNITED STATES PATENT AND TRADEMARK OFFICE
CERTIFICATE OF CORRECTION

| | | |
|---|---|---|
| PATENT NO. | : 7,627,636 B2 | Page 1 of 1 |
| APPLICATION NO. | : 10/974135 | |
| DATED | : December 1, 2009 | |
| INVENTOR(S) | : Min Wei et al. | |

It is certified that error appears in the above-identified patent and that said Letters Patent is hereby corrected as shown below:

In column 18, line 49, in Claim 11, delete "for;" and insert -- for: -- therefor.

Signed and Sealed this
Twenty-fifth Day of January, 2011

David J. Kappos
*Director of the United States Patent and Trademark Office*